Jan. 13, 1959
D. C. ENGELBART
2,869,036
GLOW DISCHARGE DEVICES
Filed May 29, 1956
11 Sheets-Sheet 1
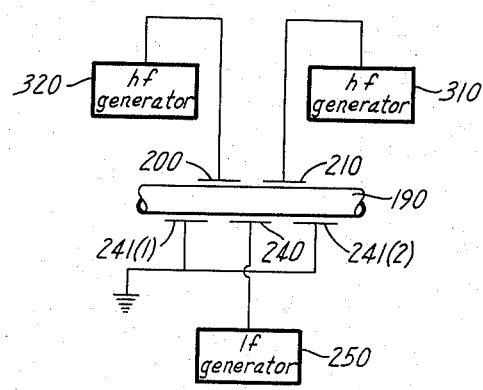
FIG_1_
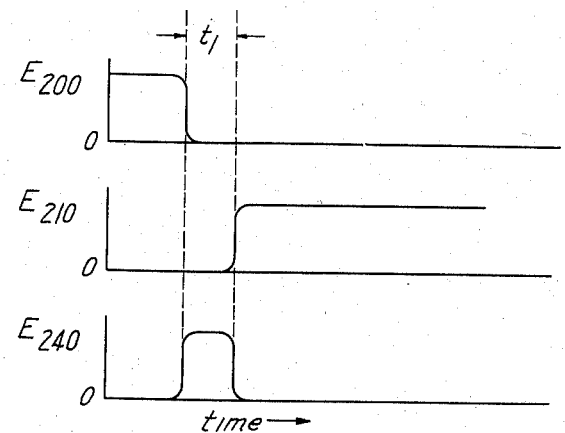
FIG_2_
INVENTOR.
Douglas C. Engelbart.
BY
Robert W. Hampton
ATTORNEY

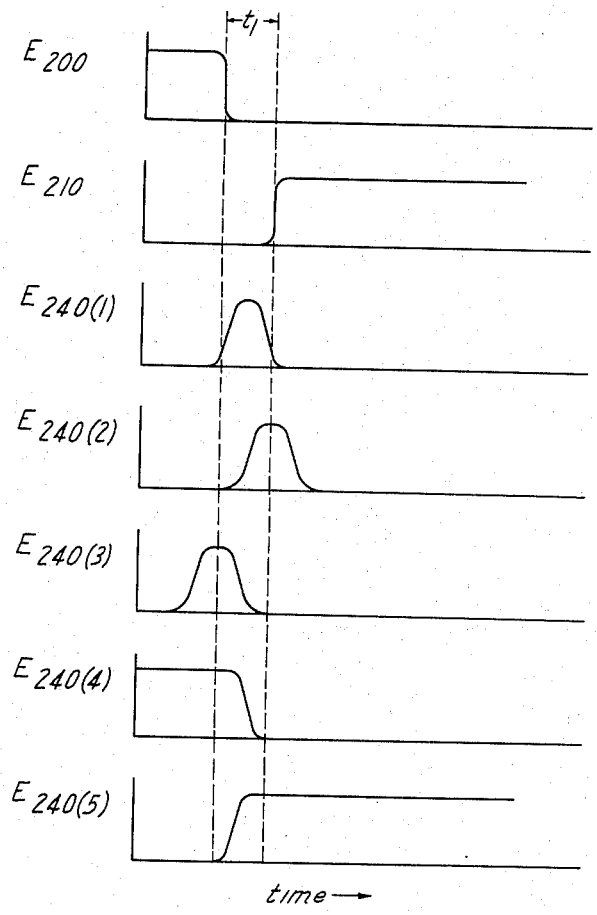
FIG_3_

Jan. 13, 1959
D. C. ENGELBART
2,869,036
GLOW DISCHARGE DEVICES
Filed May 29, 1956
11 Sheets-Sheet 3
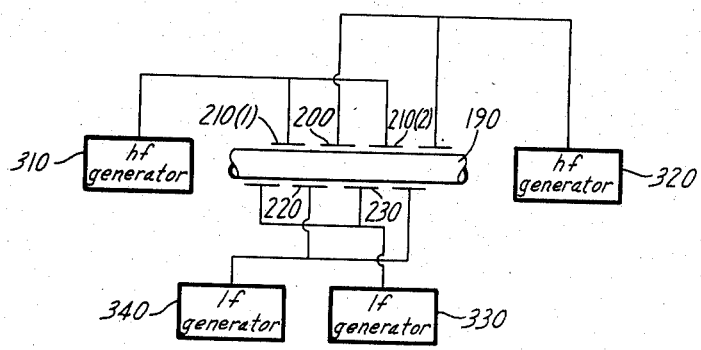
FIG_4_
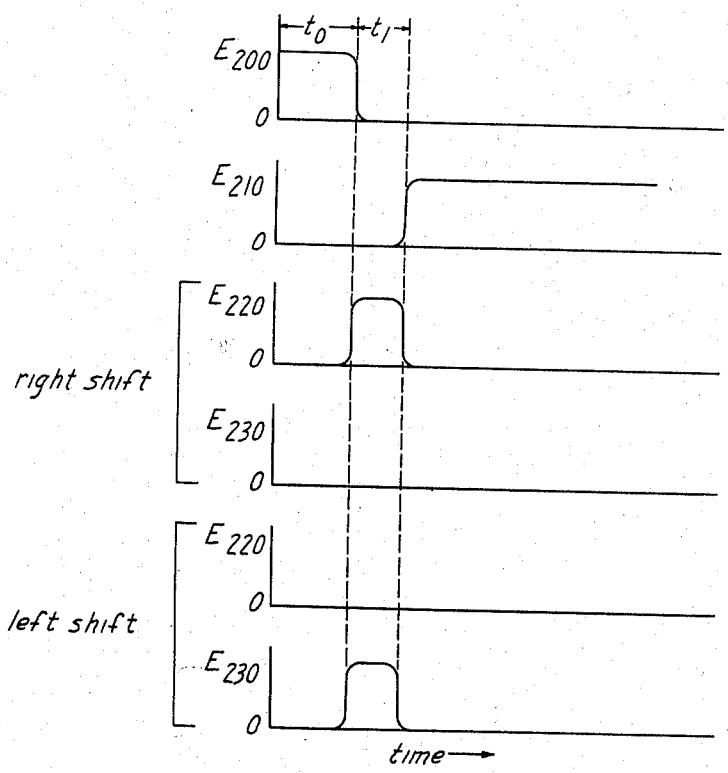
FIG_5_
INVENTOR.
Douglas C. Engelbart
BY
Robert W. Hampton
ATTORNEY

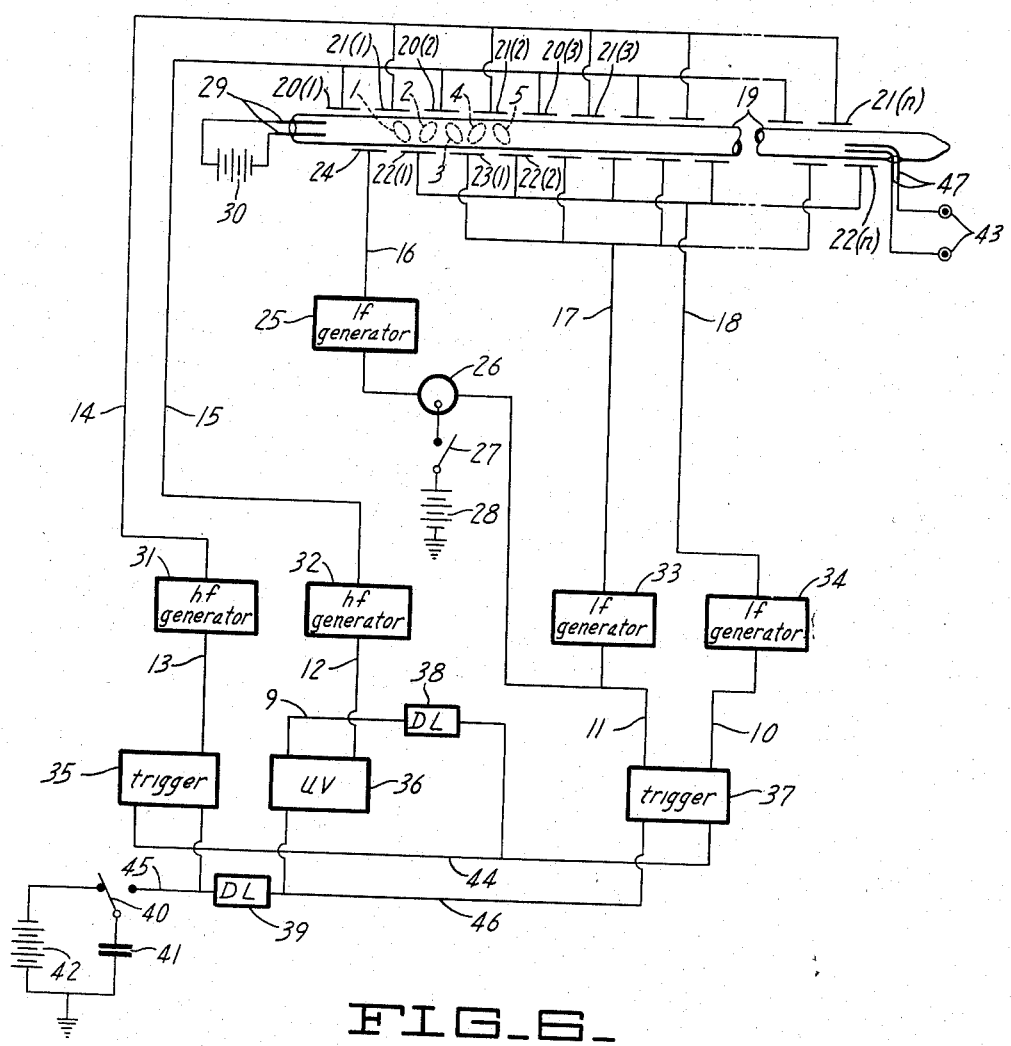
FIG_6_

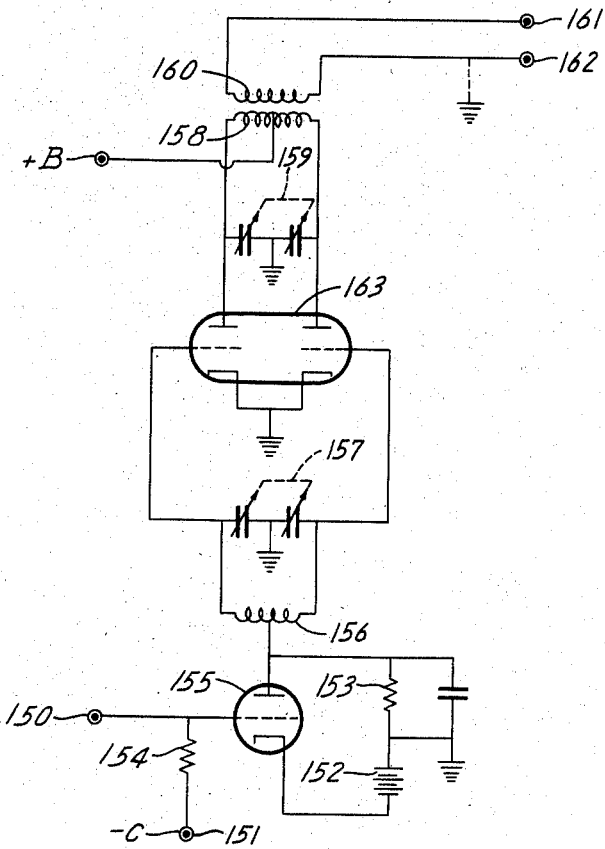
FIG_7_

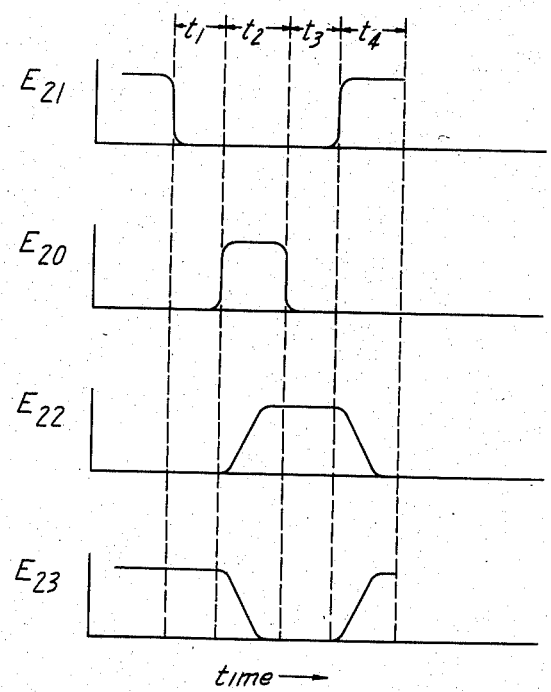

Jan. 13, 1959  D. C. ENGELBART  2,869,036
GLOW DISCHARGE DEVICES
Filed May 29, 1956  11 Sheets-Sheet 7
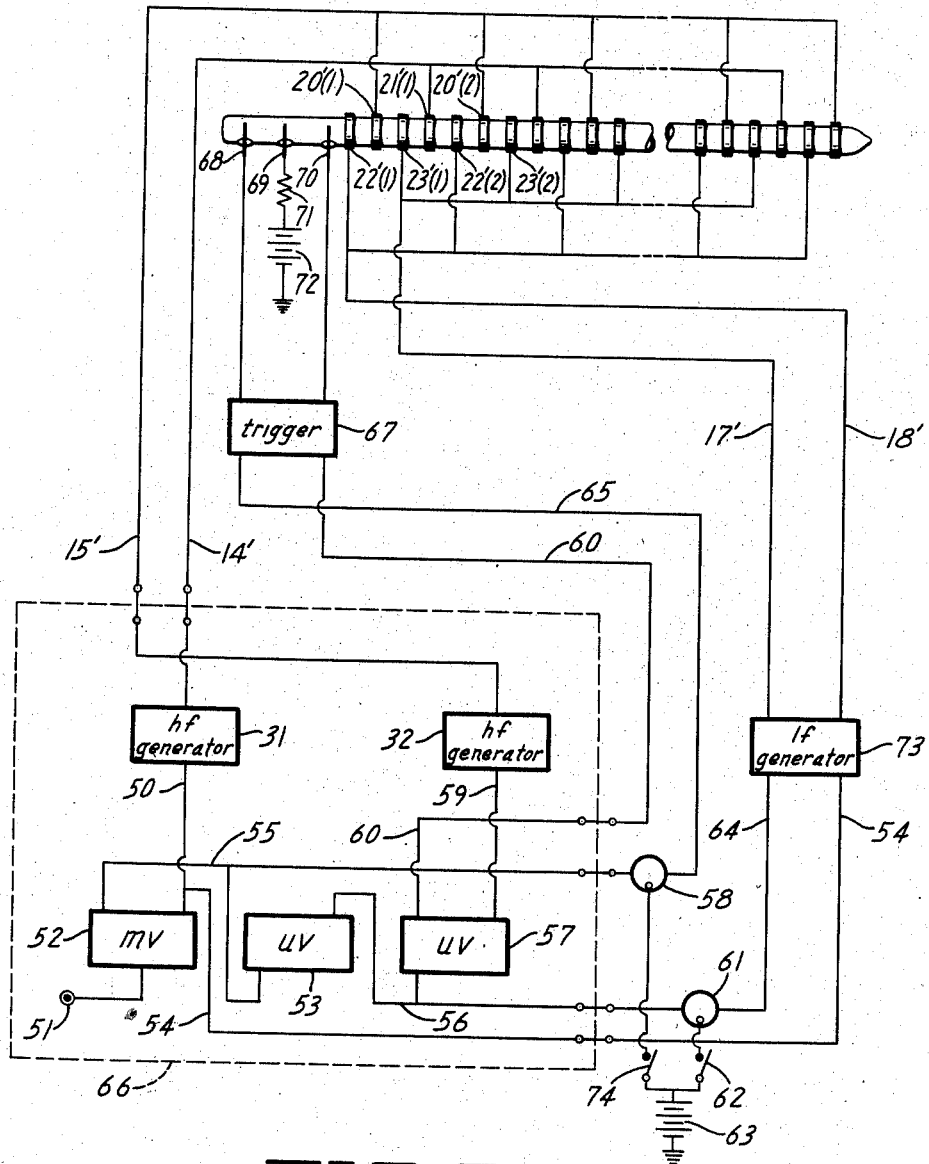
FIG_9_
INVENTOR.
Douglas C. Engelbart.
BY
Robert W. Hampton
ATTORNEY.

Jan. 13, 1959
D. C. ENGELBART
2,869,036
GLOW DISCHARGE DEVICES
Filed May 29, 1956
11 Sheets-Sheet 8
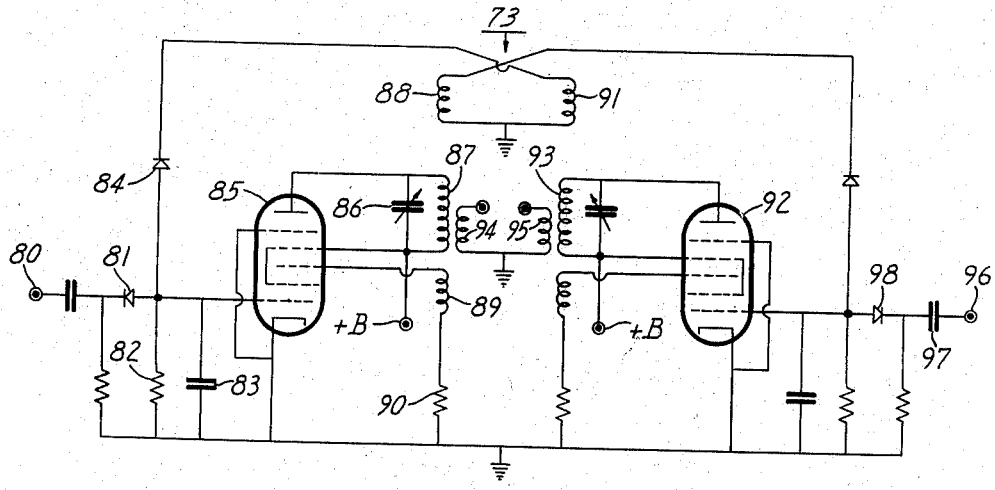
FIG_10_
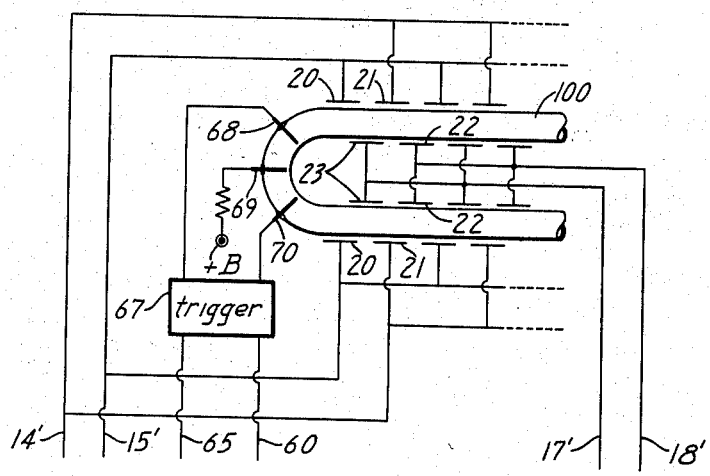
FIG_11_
INVENTOR.
Douglas C. Engelbart.
BY
Robert W. Hampton
ATTORNEY Jan. 13, 1959
D. C. ENGELBART
2,869,036
GLOW DISCHARGE DEVICES
Filed May 29, 1956
11 Sheets-Sheet 9
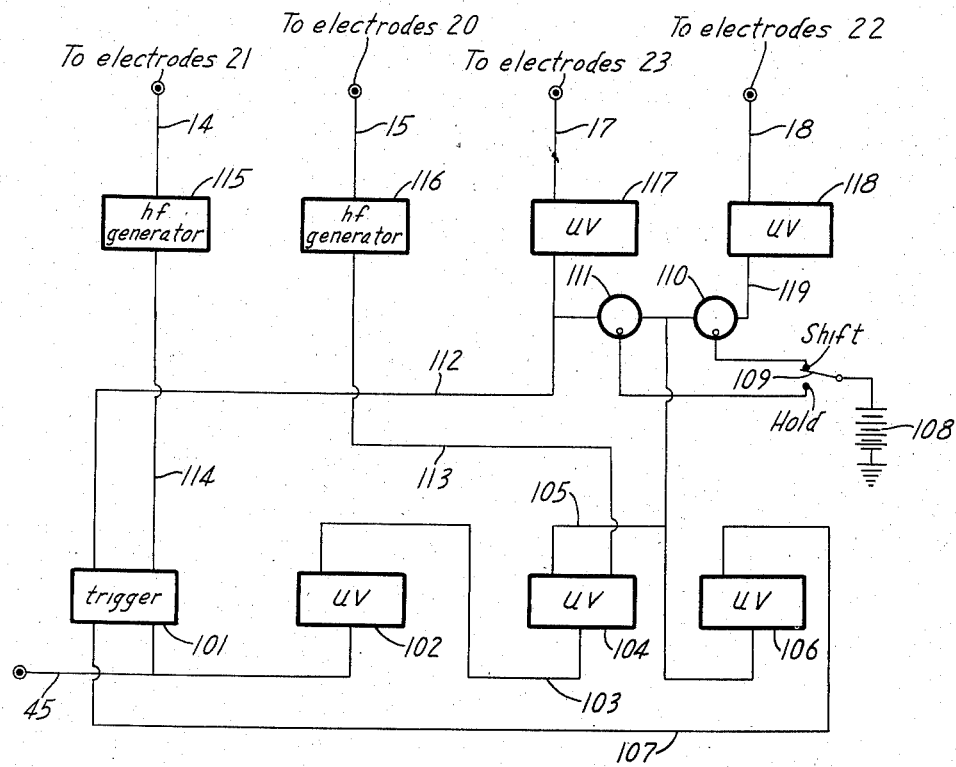
FIG_12_
INVENTOR.
Douglas C. Engelbart.
BY
Robert W. Hampton
ATTORNEY

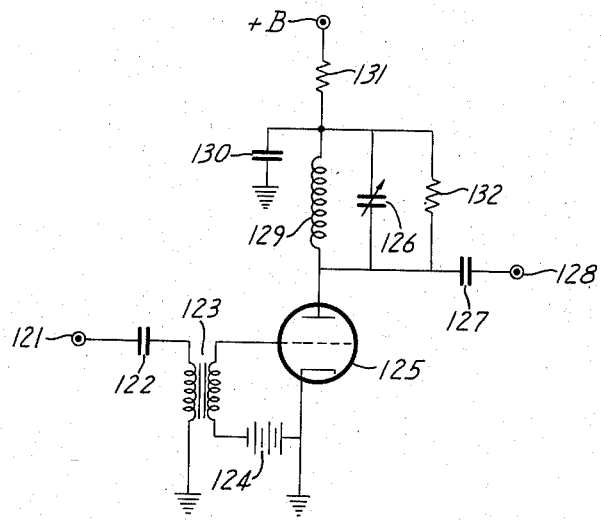
FIG_14_
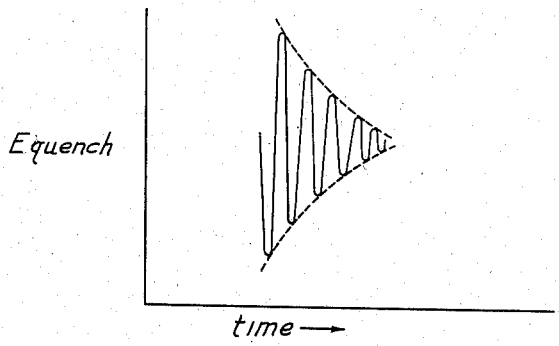
FIG_15_

United States Patent Office 2,869,036
Patented Jan. 13, 1959

2,869,036
GLOW DISCHARGE DEVICES

Douglas C. Engelbart, Berkeley, Calif., assignor to Digital Techniques, Inc., Berkeley, Calif., a corporation of California Application May 29, 1956, Serial No. 588,021

17 Claims. (Cl. 315—84.6)

This invention relates to gaseous discharge devices and particularly to multi-position glow discharge devices wherein a multiple-glow pattern can be established and shifted in discrete steps.

Such devices have special utility as shifting registers in computing systems. Each glow discharge position may represent a single order of a plural-order binary number, or "word," the presence of a glow representing a binary 1 and the absence of a glow representing a binary 0 or vice versa. Thus, a "pattern" of glow discharges may represent a selected binary word.

In my co-pending application Serial No. 521,555, filed July 12, 1955, there is disclosed a shifting register comprising a gas-filled tube and three arrays of electrodes associated with the tube defining a plurality of discrete glow discharge positions. A pattern of glow discharges may be entered into the tube, and high frequency potentials sequentially applied to the electrodes cause a stepping or shifting of the glow discharge pattern.

In my co-pending application Serial No. 588,022, filed concurrently herewith, there is disclosed an improved shifting register which offers the advantage of increased operational speed. The increased speed is obtained by applying appropriate "quenching" voltages to the decaying glow discharges to thus decrease the glow decay time and thereby increase the operational speed.

In the present invention, two external electrode arrays, in sequentially alternate arrangement, are alternately energized by high frequency potentials to sustain a pattern of glow discharges. Additionally, two similar external electrode arrays are selectively energized by low frequency or "quenching" potentials to control the shifting of the glow discharge pattern. The term "quenching" is more fully explained in the discussion of glow shifting devices which follows.

Glow shifting is effected and controlled by applying the principle of "priming" which requires that the operating voltages applied to the electrodes of a tube be in the sustaining voltage range, that is, between breakdown and extinction. The breakdown voltage is that voltage which must be applied across a gas in a given case to initiate a glow discharge. The glow discharge can be sustained by a voltage somewhat below the breakdown voltage but if the voltage is lowered sufficiently, the glow dies out at a voltage called the extinction voltage. Thus, when a first electrode is connected to a sustaining voltage, an initiated glow discharge is maintained. An adjacent, second electrode can be positioned such that the gaseous atmosphere in the region of influence of the second electrode is partially ionized due to its proximity to the glow discharge held by the first electrode. If a sustaining voltage is applied to such a "primed" electrode, it picks up a glow; whereas an unprimed electrode energized with the same potential remains inactive and does not pick up a glow. For proper operation of a glow discharge shifting or stepping tube, the operating voltages applied to the electrode arrays must remain within the sustaining voltage range. If the operating voltages drop below the extinction voltage, the glow discharges will, of course, die out and be lost; if the operating voltages rise above the breakdown voltage, spurious glow discharges will occur at unprimed electrodes.

When a sustaining voltage is removed from a first electrode holding a glow discharge, the glow discharge decays or deionizes. Thus, whether an adjacent second electrode picks up a glow or not depends not only on its position relative to the first electrode but also upon the time between the removal of the sustaining voltage from the first electrode and the application of a sustaining voltage to the adjacent second electrode. Clearly if this time is too long, the ionization in the region of influence of the second electrode drops below the priming level and the second electrode does not pick up the glow; i. e., the glow will not be transferred from the first to the second electrode.

A "transfer glow decay time" may now be defined as the time required, subsequent to the removal of a sustaining voltage from a first electrode holding a glow discharge, for the ionization level in the region of influence of an adjacent, second electrode to decrease to the extent that the application of a sustaining voltage to that second electrode does not pick up a glow discharge. In other words, it is the time required for the ionization of the gaseous atmosphere associated with the second electrode to drop below the priming level.

Glow decay time is influenced by such factors as gas composition and pressure and particularly vessel dimensions in the case of an external electrode tube. The process of deionization is not completely clear but it is thought that for the low-pressure gaseous discharge the deionization process is mainly a process of diffusion of the electrons and ions to the vessel walls (and to the electrode surfaces in the case of internal electrodes). For example, experiments with external electrode glow shifting tubes, energized by high frequency, show that glow decay time is less with tubes of small diameter than with tubes of large diameter.

It has been found that the diffusion process can be accelerated and, therefore, glow decay time decreased by subjecting the deionizing gas to appropriate electric fields which aid in the dispersion of the discharge plasma by sweeping the charges to the vessel walls. The electric fields may be applied to the gas by external electrodes and may be developed by an alternating potential at an appropriate frequency or by a D. C. potential change at the appropriate time in an operating cycle. A potential thus applied to shorten glow decay time is referred to as a "quenching" voltage.

The glow shifting device of the present invention employs the technique of quenching to control the transfer or shifting of glow discharges between electrodes. The time interval between the removal of a sustaining voltage from a first electrode and the application of a sustaining voltage to an adjacent second electrode may be represented by $t$. Then if the first electrode is holding a glow and if $t$ is less than the transfer glow decay time, the glow is transferred from the first to the second electrode. However, if, during the interval $t$, a quenching potential is applied to the gaseous atmosphere between said first and second electrodes, the transfer glow decay time can be decreased to the extent that a glow transfer does not occur. Thus by suitably controlling the quenching potential a glow transfer may be allowed or not.

The present invention has a particular advantage in that a glow pattern is controlled solely by the quenching potentials, whether right shift, left shift, or hold. The high frequency energizing potentials are applied in a regular cyclical manner. The high frequency generators may, therefore, be common to or may drive several separate shifting registers, an individual register being independently controlled by its own quenching circuit.

Thus, a general object of the present invention is to control the shifting or stepping of glow discharges solely by the application of quenching potentials.

Another object is to establish and rapidly shift a glow discharge in a gas-filled tube by the conjoint application of high frequency energizing potentials and low frequency quenching potentials to entirely external electrodes.

A further object is to provide an improved glow discharge shifting tube of novel construction and operation.

Other objects of the invention are:

To selectably shift in either of two directions or to hold a pattern of glow discharges in a gas-filled envelope through control of quenching potentials; and to detect glow discharges at a selected discrete glow discharge position.

The underlying principle of the present invention is the application of quenching or deionizing potentials to control the shifting or transfer of a glow discharge.

Other objects and pinciples of the invention will appear from the following description, reference being made to the accompanying drawings, wherein:

Fig. 1 illustrates a glow transfer quench gate;

Fig. 2 is a timing diagram showing the envelopes of energizing and quenching potentials as may be applied to to the quench gate of Fig. 1;

Fig. 3 is a graph of high frequency energizing potentials together with several alternative "D. C." quench potentials;

Fig. 4 illustrates a device for shifting a glow discharge to the right or to the left as controlled by quenching potentials;

Fig. 5 is a timing diagram of potentials applied to the device of Fig. 4;

Fig. 6 is an illustration of a glow discharge shifting tube including a quench gate input and a block diagram of energizing and control circuitry;

Fig. 7 is a schematic diagram of a suitable signal generator;

Fig. 8 is a timing diagram of a one-cycle shift sequence of the device of Fig. 6;

Fig. 9 is an illustration of a glow discharge shifting register including an internal electrode input circuit and a block diagram of energizing and control circuitry;

Fig. 10 is a schematic diagram of a bistable signal generator;

Fig. 11 is an illustration of an embodiment of the present invention for simultaneously entering and shifting both a word and its complement;

Fig. 12 is a block diagram of an embodiment of a control circuit for applying D. C. pulse quench potentials;

Fig. 14 is a schematic diagram of a damped wave quench potential generator; and

Fig. 15 is an illustration of the output waveform of the device of Fig. 14.

Figure 13:
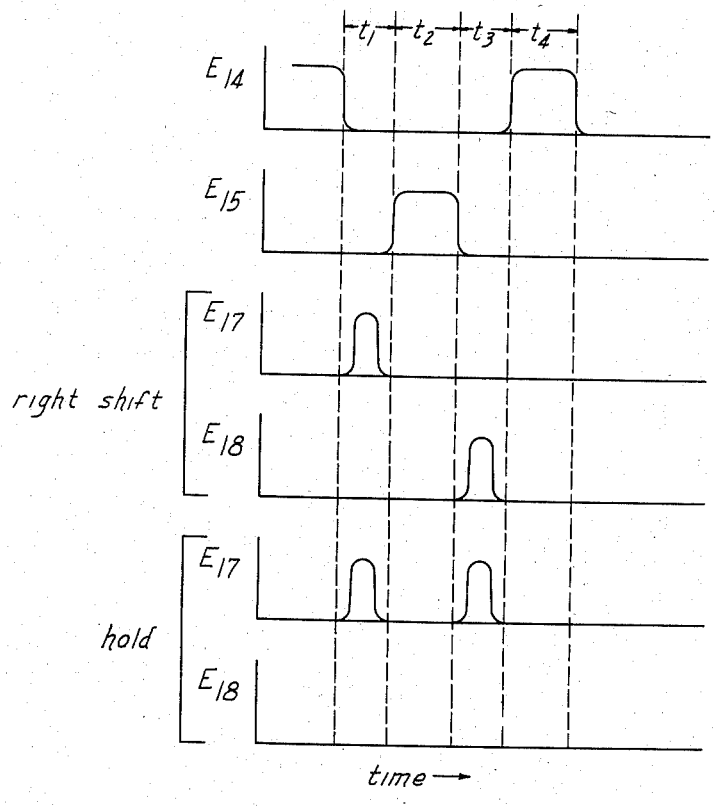
Fig. 13 is a timing diagram of the potentials developed by the circuit of Fig. 12.

Fig. 1 illustrates a glow discharge quench gating arrangement embodying the principles of the present invention. A discharge channel 190 containing a gaseous atmosphere may be, for example, 6 mm. outside diameter (0.6 mm. wall thickness) glass tube filled to a pressure of 7.5 mm. of Hg with neon. External electrodes 200, 210, 240, and 241 may be formed of any conducting material. They may be, for example, about one quarter of an inch in width and spaced from one another about three-sixteenths of an inch. The electrodes may be formed to the curvature of the vessel and may extend along approximately one quarter of the circumference. The electrodes may be plated on the glass or attached with an adhesive to hold them in proper position or may be held in position by structure independent of the vessel.

In the computer art, a gate is a circuit for passing a signal, or not, in accordance with the presence or absence of another signal. Then, by analogy, the device of Fig. 1 is a gate since a glow discharge may be transferred from one electrode to another depending on whether or not a quenching voltage is applied at an appropriate time to the gaseous atmosphere associated with these electrodes. Assume, for example, that a glow discharge is held in the glow discharge channel 190 at electrode 200 (Fig. 1) by the On condition of a first high frequency generator 320 which applies a high frequency energizing potential to electrode 200 as shown graphically by the potential envelope $E_{200}$ (Fig. 2). A low frequency quench potential generator, shown at 250 (Fig. 1), is connected to a quenching electrode 240 positioned opposite and between the energizing electrode 200 and an adjacent energizing electrode 210. Assume that the low frequency generator 250 is Off and that its output circuit presents a low impedance to the energizing potentials. Assume further that a second high frequency generator 310, connected to energizing electrode 210, is also Off, and that each of the generators 310 and 320 presents a low impedance to the quench potential. Under these conditions, the glow discharge at electrode 200 extends to both an associated grounded electrode 241(1) and to electrode 240. The electrodes are positioned so that under these conditions the energizing electrode 210 is primed. The glow discharge may be transferred from electrode 200 to electrode 210 simply by turning generator 320 Off and after a time $t_1$ (Fig. 2) turning generator 310 On, where $t_1$ is less than the transfer glow decay time.

The glow transfer may be prevented by turning the low frequency generator 250 On during the interval $t_1$ to thereby subject the decaying glow discharge to the quench potential $E_{140}$ (Fig. 2). As hereinbefore explained, the application of a quench potential hastens glow decay; therefore, when generator 310 is turned On ($E_{210}$, Fig. 2) after the interval $t_1$, the ionization is below the priming level and electrode 210 does not pick up the glow. Thus, the glow discharge quench gate of Fig. 1 can selectably either pass or not pass a glow discharge.

It may be noted that the timing diagram of Fig. 2 shows the envelopes of the energizing and quenching potentials. Optimum energizing and quenching voltages and frequencies are dependent on the physical characteristics of the glow transfer device. In the present example, the energizing potential may be in the order of 150 volts R. M. S. and is adjusted experimentally to lie between the breakdown and extension voltages. Energizing frequencies are not critical, and frequencies above about ten megacycles, for example 30 megacycles, may be conveniently employed. The frequency of the quench potential is considerably lower than the frequency of the energizing potential. In the present example, the most advantageous quench potential is found to be about 100 volts R. M. S. in the range of 1.5 to 2.5 megacycles. The most effective quench potential in a given case may be found experimentally by plotting a family of curves of "quenched glow decay time" vs. quench voltage for selected frequencies. A simpler, but usually adequate, method is to apply a quench potential to a sustained glow discharge and adjust the quench voltage for maximum visual constriction of the glow discharge. By trying several different quench frequencies, it will be found that quench frequencies near optimum give greatest constriction of the glow discharge. This is also a particularly convenient way of setting the quench voltage, during experimentation, after a quench frequency has been selected.

As previously mentioned, a D. C. potential change at an appropriate time, as well as an A. C. potential, is effective for quenching an ionized gas. Several possible "D. C." quench waveforms $E_{240(1)}$ to $E_{240(C5)}$ are shown in Fig. 3. For effective quenching, it is necessary only that there be a substantial change, in the order of 150 volts, in a D. C. voltage applied to a quenching electrode, such as 240 (Fig. 1) during the interval $t_1$. The quenching operation is similar in both D. C. and low frequency A. C. quenching. In both cases, the charged particles of the gas are subjected to electric fields which tend to sweep these charged particles to the vessel walls. The quench signal shown as $E_{240(1)}$ (Fig. 3) might more appropriately be called "pulse quenching" since the potential both rises and falls within the interval $t_1$. Potentials $E_{240(2)}$ and $E_{240(3)}$ are also of a pulse type and are equally effective. The only difference between them is that $E_{240(2)}$ rises during the interval $t_1$ while $E_{240(3)}$ falls during the interval $t_1$. $E_{240(4)}$ and $E_{240(5)}$ illustrate D. C. potentials which either fall or rise the required amount during the interval $t_1$. Circuits for obtaining and applying "D. C." quench signals will be described hereinafter. However, it may be noted here that any of the "D. C." quench signals of Fig. 3 may be used with the quench gate of Fig. 1; i. e., a "D. C." quench signal may be applied to quench electrode 240 during the interval $t_1$ to inhibit the transfer of a glow discharge.

Fig. 4 illustrates a glow discharge transfer or shifting arrangement embodying the principles of the present invention. A glow discharge may be shifted selectably either to the right or the left as controlled by the quench potentials. Assume that a glow discharge is held at electrode 200 by the On condition of H. F. generator 320 which applies energizing potential $E_{200}$ (Fig. 5) to the electrode 200 during the interval $t_0$. It may be seen from the timing diagram of Fig. 5 that none of the other electrodes are energized during this interval $t_0$. Thus, the glow discharge is between electrode 200 and both electrodes 220 and 230. Under these conditions, both energizing electrodes 210(1) and 210(2) are primed. At the end of interval $t_0$, generator 320 is turned Off and at the end of interval $t_1$, generator 310 is turned On to apply an energizing potential to electrodes 210 as shown by $E_{210}$ in Fig. 5. If a right shift of the glow is desired, then a first low frequency generator 340 is turned On during the interval $t_1$, to apply a quench potential $E_{220}$ to electrode 220. Consequently, when potential $E_{210}$ is applied after the interval $t_1$, electrode 210(2) picks up a glow while electrode 210(1) does not since the quenching potential $E_{220}$ reduces the ionization in the region of electrode 210(1) to below the priming level. In a similar manner, if a left shift is desired, then a second low frequency generator 330 is turned On during the interval $t_1$ while generator 340 is not.

A glow discharge shifting register is illustrated in Fig. 6 together with its energizing and control circuitry. A plurality of discrete glow discharges may be entered into the tube and shifted or held as desired. An envelope 19 is filled to a low pressure with an ionizable gas. A pair of internal "stabilizing" electrodes 29 at one end of the tube are energized by a potential source shown as a battery 30, and a glow discharge is thus maintained in the end of the tube. This glow discharge serves two purposes. First, it maintains the quiescent ionization level at a constant value which stabilizes the register operation; second, it primes an adjacent external energizing electrode 20(1) to provide entry of glow discharges into the tube. A plurality of energizing electrodes, comprising first and second iterative arrays of electrodes 20 and 21, are positioned adjacent envelope 19 and connected in a sequentially alternate arrangement, with alternate electrodes connected together. Similar first and second arrays of quenching electrodes, comprising electrodes 22 and 23, are positioned adjacent the opposite side of the envelope, with each quenching electrode being positioned along the envelope between and overlapping a pair of the energizing electrodes. Energizing electrodes 20(1) and 21(1) cooperate with a quench electrode 24 to form a quench gate input. Energizing electrodes 20 are driven by a first high frequency generator 32 through a lead 15 and electrodes 21 are similarly connected to a second high frequency generator 31 by a lead 14. Quench potentials are developed by a pair of low frequency generators 33 and 34, and are applied to quench electrodes 23 and 22 through respective leads 17 and 18. A further low frequency generator 25 is provided for the quench gate input and is connected to electrode 24 by a lead 16.

Circuitry for control of the various generators includes a pair of trigger circuits 35 and 37, a univibrator 36, a gate 26 and a pair of delay circuits 38 and 39. Trigger circuits 35 and 37 may be, for example, of ordinary Eccles-Jordan type such as shown in Fig. 2.36 of "Electronics" by Elmore and Sands, National Nuclear Energy Series, division V-volume 1, McGraw Hill, 1949. Univibrator 36 is of the well-known type which provides an output pulse of selectable duration in response to each input pulse, and may comprise, for example, a circuit as shown in Fig. 2.33 of the above reference. Gate 26 may be any one of the usual types that are conditioned for passing a signal by an applied arming potential. A suitable gate is shown in Fig. 3 of U. S. Patent No. 2,715,997, issued August 23, 1955, to Charles M. Hill, to which patent reference is made for a full description of the gate. Delay lines 38 and 39 may be of the type disclosed in Fig. 5 of U. S. Patent No. 2,467,857, issued April 19, 1949, to J. H. Rubel et al. Alternatively, delay lines 38 and 39 may comprise univibrator circuits similar to univibrator 36 in which case there is the advantage of convenient adjustability of the delay time.

The high frequency energizing potential generators 31 and 32, and the low frequency quench potential generators 25, 33, and 34, may take a variety of forms. One suitable signal generating circuit is shown in Fig. 7. This same basic circuit may be used for high frequency and low frequency generators by appropriate choice of tank circuit values.

In Fig. 7 a tube 163, shown for example as a duotriode, is connected in a tuned-plate, tuned grid oscillator circuit comprising a grid tank circuit 156 and 157 and a plate tank circuit 158 and 159. A keying tube 155 is provided to control the oscillator. By suitable selection of keying tube control grid bias-C, the generator can be operated either as normally Off or normally On. Consider, for example, the case where battery 152 is 250 volts and the bias potential −C is also 250 volts. Since the keying tube grid and cathode are then at the same potential, the tube 155 normally conducts, thereby applying a relatively high negative potential through grid tank coil 156 to the grids of the oscillator tube 163 to render the oscillator normally inoperative. A negative potential of suitable level applied to a terminal 150 keys the circuit to operation by cutting off conduction of the keying tube 155, thereby removing the blocking bias from the oscillator grids. The signal generator may be operated as normally On by adjusting the bias potential −C to maintain the keying tube 155 normally at cutoff and thereby maintain the oscillator normally in operation. A positive potential applied to terminal 150, under these conditions, causes the keying tube 155 to conduct, thereby biasing the oscillator to the nonoperating, or Off state. Output is taken from the signal generator at terminals 161 and 162 connected to a coil 160 that is coupled to plate tank coil 158. Terminal 162 is grounded when single-ended output is desired.

Operation of the gas tube shifting register of Fig. 6 may be more clearly understood from the following description of the entry and shifting of values in the register. Generator 31 is normally On, thereby applying an energizing potential to electrodes 21 as shown graphically by $E_{21}$ (Fig. 8). Generator 32 and generator 34 are normally Off, while generator 33 is normally On for applying a quench potential $E_{23}$ (Fig. 8) to quench electrodes 23. Also, generator 25 is normally On for applying a quench potential to the quench gate input electrode 24. The envelope of the quench potential applied to electrode 24 is not specifically shown in Fig. 8; however, it may be noted that if an input switch 27 is closed, gate 26 is armed by a potential source 28, and generator 33 is controlled by the potential on an output lead 11 of trigger circuit 37. In other words, when switch 27 is closed, the potential on electrode 24 is similar to that shown by $E_{23}$ (Fig. 8). The entry of glow discharges into the register will be explained in detail hereinafter.

Shifting will be described by assuming, for example, that a glow discharge has been entered and is held between electrode 21(1) and electrode 22(1) by the energizing potential applied to electrodes 21. Such a glow discharge is illustrated at 1 (Fig. 6). It should be noted that a glow discharge does not necessarily assume the shape illustrated. A shift cycle is initiated by applying a shifting pulse from a suitable source to a lead 45 (Fig. 6). This shifting pulse may be a clock pulse from an associated computer as, for example, from terminal "OP" shown in Fig. 35 of the co-pending application Serial No. 458,473, filed September 27, 1954 by George B. Greene et al. A shifting pulse source is illustrated in Fig. 6 by a battery 42, a capacitor 41 and a single-pole, double-throw switch 40. With switch 40 closed to the left, the capacitor is charged to the voltage of the battery. When switch 40 is momentarily closed to the right, a pulse is applied to lead 45. This pulse sets trigger circuit 35 and simultaneously enters delay line 39.

When trigger circuit 35 is set by the shifting pulse, it keys generator 31 Off by applying to it a relatively high potential through a lead 13. Thus the energizing potential is removed from electrodes 21 at the beginning of the interval $t_1$ and shown in Fig. 8. During the interval $t_1$, quenching potential $E_{23}$ remains applied to electrodes 23. Likewise a quenching potential remains applied to the input quench gate electrode 24. Thus, during the interval $t_1$, the region between electrodes 20(1) and 21(1) is quenched as are all the regions to the right of electrodes 20 and between electrodes 20 and the adjacent electrodes 21. On the other hand, the regions to the left of electrodes 20 are not quenched during the interval $t_1$; consequently, electrode 20(2) remains primed, and when potential $E_{20}$ is applied during the interval $t_2$ (Fig. 8), the glow discharge is picked up as illustrated at 2 (Fig. 6). Generator 32 is keyed On to apply the potential $E_{20}$ as follows: The delay line 39 determines the interval $t_1$ by delaying the shifting pulse applied to lead 45 as previously mentioned. At the end of interval $t_1$ the pulse emerges from the delay line and triggers univibrator 36 to its abnormal state. In this state, a relatively low potential on a lead 12 keys generator 32 On to apply the potential $E_{20}$ through lead 15. The pulse which emerges from delay line 39 is also conducted over a lead 46 to reset trigger circuit 37. The consequent low potential on an output lead 10 keys generator 34 On and the converse high potential on output lead 11 keys generator 33 Off. Thus, the quenching potentials on electrodes 22 and 23 rise and fall respectively during the interval $t_2$ as shown by the potential envelopes $E_{22}$ and $E_{23}$ (Fig. 8). With electrode 20(2) energized and electrode 23(1) now unquenched the glow discharge shifts to a position as illustrated at 3. The glow discharge in this position primes the adjacent electrode 21(2).

Univibrator 36 determines the interval $t_2$. When the univibrator returns to its normal state, generator 32 is keyed Off to remove potential $E_{20}$ from electrodes 20. In returning to its normal state the univibrator also develops a pulse on a lead 9 and this pulse enters delay line 38. This delay line determines the interval $t_3$ (Fig. 8). During this delay interval the quenching potential $E_{22}$ remains applied to electrodes 22 by the On condition of generator 34, thereby quenching the regions to the left of electrodes 20 between electrodes 21 and 20. However, the regions to the right of electrodes 20 are not quenched during the interval $t_3$, and therefore the electrode 21(2) remains primed. At the end of the interval $t_3$ the above-mentioned pulse emerges from delay line 38 and is conducted over a lead 44 to reset and set, respectively, trigger circuit 35 and trigger circuit 37. Consequently, generator 31 is keyed On to return the potential $E_{21}$ to electrodes 21. Since electrode 21(2) is primed, as described above, it picks up the glow discharge as illustrated at 4. The resetting of trigger circuit 37 keys generator 34 Off and generator 33 is returned to its On state. Thus during the interval $t_4$, the potentials applied to the glow discharge shifting tube return to their initial conditions to complete a shifting cycle. As the quench potential $E_{22}$ falls and the quench potential $E_{23}$ rises during the interval $t_4$, the glow discharge shifts to a position at 5 (Fig. 6).

Thus, during a first shift cycle a glow discharge may be shifted from electrode 21(1) to electrode 21(2). A subsequent shift cycle will shift the glow from electrode 21(2) to electrode 21(3) and so on. Each electrode 21 may therefore be considered as a discrete glow discharge position and each such discrete glow discharge position may be considered as representing a respective binary order. For example, if values are entered lowest order first, then electrode 21(1) is the highest order position of the register, electrode 21(2) is the second from highest order position, and electrode 21(n) is the lowest order position of the register. If it be understood that an entered glow discharge represents a binary 1 and the absence of a glow discharge represents a binary 0, then each cycle of operation of the shift register advances each 1-representing glow discharge from one "order-representing" position in another, and each "no glow" is likewise advanced. Each shifting cycle thus corresponds to a time interval often called a "digit interval" in the computer art.

As previously mentioned, quench electrode 24 (Fig. 6) and energizing electrodes 20(1) and 21(1) cooperate to form a quench gate for entering 1-representing glow discharges into the shifting register. Electrode 20(1) is positioned to be continually primed by the discharge maintained by stabilizing electrodes 29. Therefore when potential $E_{20}$ (Fig. 8) is applied during the interval $t_2$, electrode 20(1) picks up a glow. A glow discharge at electrode 20(1) primes the adjacent electrode 21(1). Whether the glow discharge is transferred to electrode 21(1) or not depends on whether or not a quench potential is applied to quench electrode 24 during the interval $t_3$ (Fig. 8). As previously mentioned, generator 25 is controlled from the output 11 of trigger circuit 37 through an input control gate 26. Gate 26 is illustrated in Fig. 6 as being controlled by a manually operated switch 27 which selectably connects potential source 28 to the arming terminal of the gate. Obviously, this input control gate may be appropriately controlled from an associated computer circuit. For example, from the 1's Transfer Bus shown in Fig. 32 of the above-mentioned co-pending application Serial No. 458,473.

When switch 27 is closed, gate 26 is armed and generator 25 is thus controlled together with generator 33, in which case, generator 25 is turned Off during the interval $t_2$ and remains Off during interval $t_3$. A glow discharge is thus formed between electrode 20(1) and electrode 24 for priming the first "order-representing" energizing electrode 21(1) to thereby enter a 1-representing glow discharge. However, if switch 27 is open, the normally On generator 25 applies the quenching potential to electrode 24 throughout the shift cycle, in which case, a glow discharge is not transferred to electrode 21(1) and a 0-representing "no-glow" is entered.

Provision for output from the shifting register of Fig. 6 is in the form of a pair of internal electrodes 47 positioned in the region of influence of electrode 21(n). A glow discharge held by electrode 21(n) causes a drop in the impedance across a pair of output terminals 43. This impedance drop may be utilized by circuitry (not shown) to develop a suitable output signal. Such internal output electrodes are disclosed and more fully explained in the above-mentioned co-pending application Serial No. 588,022.

Another embodiment of the present invention is shown in Fig. 9. An axial-field construction is employed. In contrast to the arrangement of Fig. 6, wherein the energizing fields are applied across the tube, in the axial-field construction the applied fields are along the tube. Each electrode 20', 21', 22' and 23' forms a ring on band around the tube. These electrodes may, for example, be formed of number 18 wire and may be spaced about one-fourth of an inch apart. The tube may be formed of 3 mm. outside diameter glass tubing filed with neon to a pressure of 7.5 mm. of Hg. The advantage of the axial-field construction is that the electrode spacing is then independent of the tube diameter, thus allowing the use of small diameter tubes with consequent shorter glow decay time and faster shifting speeds while still permitting reasonably low operating potentials.

An alternative input circuit is employed in the shifting register of Fig. 9. A set of internal electrodes 68, 69 and 70 are arranged in the left end of the envelope to maintain a glow discharge either between electrodes 68 and 69 or between 69 and 70. A battery 72 or an equivalent D. C. source is connected to electrode 69 through a limiting resistor 71 to provide the necessary glow discharge sustaining potential. Electrodes 68 and 70 are connected to respective outputs of an input control trigger circuit 67. When the trigger circuit is set, a relatively law potential is applied to electrode 68 and a relatively high potential to electrode 70. The potential on electrode 69 is adjusted to maintain a glow discharge between electrodes 68 and 69 under these conditions. Conversely, when the trigger circuit 67 is reset, the low potential is on electrodes 70 and the discharge is between electrodes 69 and 70. A glow discharge between electrodes 69 and 70 primes the gaseous atmosphere between energizing electrode 20'(1) and quench electrode 22'(1) to thereby provide for the entry of a glow discharge into the register. Control of the input trigger circuit 67 through a gate 58 and a pair of leads 60 and 65 will be described subsequently.

An outstanding advantage of the embodiment of Fig. 9 is that the high frequency generators 31 and 32, and the associated control circuitry shown enclosed by a dashed line 66 may be common to, or may drive several separate shifting registers connected in parallel. The control circuit, comprising a free-running multivibrator 52 and a pair of univibrators 53 and 57, is arranged to key generators 31 and 32 On and Off in a regular cyclical manner. The input and shifting of each individual register can be controlled independently by its own quenching circuit which in Fig. 9 includes a gate 61 and a bi-stable low frequency generator 73 hereinafter described. A suitable embodiment of multivibrator 52 may be found in Fig. 2.30 of the previously mentioned "Electronics by Elmore and Sands. A terminal 51, connected to the multivibrator, may receive a signal for synchronizing the frequency of the multivibrator with other circuits of a computer in a well-known manner. Univibrators 53 and 57 may be similar to univibrator 36 of Fig. 6.

As multivibrator 52 oscillates, the potential levels on output leads 50 and 55 alternate inversely from a relatively low value to a relatively high value. It may arbitrarily be stated that a shift cycle or digit interval begins as lead 50 assumes its higher potential. This high potential keys generator 31 Off, as previously described in connection with Fig. 6, and as illustrated by the fall of potential $E_{21}$ (Fig. 8) at the beginning of the interval $t_1$. At the same time as the potential on lead 50 changes to a high value, the potential on lead 55 changes to a low value. This change to a low potential on lead 55 is differentiated to produce a negative pulse which triggers univibrator 53 to its abnormal state. Univibrator 53 determines the interval $t_1$ (Fig. 8). At the end of this interval. univibrator 53 returns to its normal state and applies a pulse through a lead 56 to trigger univibrator 57 to its abnormal state at the beginning of interval $t_2$ (Fig. 8). Univibrator 57 thus determines interval $t_2$, and during this interval a relatively low potential on a lead 59 keys generator 32 to its On condition as illustrated by the potential envelops $E_{20}$ (Fig. 8). Univibrator 57 returns to its normal state at the end of interval $t_2$ and keys generator 32 Off to mark the beginning of interval $t_3$. During this interval both high frequency generators 31 and 32 remain Off. At the beginning of interval $t_4$, multivibrator 52 reverses its state to key generator 31 On as illustrated by the potential envelope $E_{21}$ (Fig. 8) during the interval $t_4$. At the end of interval $t_4$ multivibrator 52 again reverses state to begin another cycle as described. Thus, generators 31 and 32 are controlled in a regular cyclic manner, and output leads 14' and 15' may be connected to several separate registers in parallel, limited only by the output capabilities of the high frequency generators. It should be noted that multivibrator 52 must operate in an asymmetrical manner. The parameters of the multivibrator circuit are chosen so that the multivibrator remains in one of its states during the intervals $t_1$, $t_2$, and $t_3$ and in its other state for only the interval $t_4$.

As previously mentioned, the shifting of glow discharges within a given register is under control of quenching circuitry individual to each shifting register. In Fig. 9, this circuitry includes gate 61, low frequency generator 73 and input control gate 58.

Generator 73 is shown schematically in Fig. 10. A pair of pentagrid tubes 85 and 92 are shown, by way of example, as being arranged to form a bistable oscillator circuit. When one of the tubes with its associated circuit is oscillating, a portion of the energy in its output circuit is rectified, and the resulting D. C. potential is applied to a grid of the other tube to hold the latter in a nonoperating condition. The circuit may be triggered by a negative pulse applied to the operating tube; this allows the other tube to operate, and to develop a "cut-off" bias potential at a grid of the triggered tube. Assure, for example, that tube 92 is oscillating. An A. C. potential is therefore developed across a pickup coil 91 coupled to a plate tank inductor 93. This A. C. potential is rectified by a diode 84 with the result that a D. C. potential is developed across a grid resistor 82. A capacitor 83 provides a smoothing action. The number of turns of coil 91 and its coupling to the tank coil 93 are adjusted to give a cutoff bias potential to the first grid of tube 85. Thus, tube 85 remains cut off as long as tube 92 is operating. The circuit is triggered by applying a negative pulse to the first grid of tube 92 via a terminal 96, a capacitor 97 and a diode 98. Diode 98 and a corresponding diode 81 on the opposite side of the circuit limit the response of the circuit to negative pulses only. The negative pulse on terminal 96 cuts off tube 92. With tube 92 cut off, coil 91 is no longer energized. Thus, the cutoff bias potential disappears from tube 85 and allows this tube to go into oscillation. Operation of tube 85 energizes a coil 88 which now causes a cutoff bias potential to be developed on the first grid of tube 92, thereby maintaining the latter in its non-operating state as long as tube 85 remains oscillating. The oscillatory circuit associated with each tube, for example tube 85, comprises a plate tank circuit consisting of a capacitor 86 and coil 87, a feedback coil 89 connected to the third grid and coupled to the plate coil 87, and a grid leak resistor 90. Output is taken from a pair of output coils 94 and 95 which are coupled to respective plate tank coils 87 and 93. Plate tank circuit constants are chosen to give the proper quench frequency, as previously discussed.

It should be pointed out that the bi-stable oscillator circuit of Fig. 10 is not limited to the use of pentagrid tubes. For example, a pair of triodes, one constituting the oscillator circuit and the other arranged as a control tube, may replace each pentagrid tube; i. e., an arrangement similar to Fig. 7. In this case, the diodes 84 (Fig. 10) are reversed to apply positive bias potential to the control tube.

Referring again to Fig. 9, the triggering pulses for the low frequency generator 73 are derived from the common control circuitry enclosed by the dashed line 66. It will be recalled from the previous description of the common control circuit that univibrator 53 returns to its normal state at the end of interval $t_1$ (Fig. 8) and a negative pulse is thereby developed on lead 56. This pulse triggers univibrator 57 to its abnormal state and also is applied to quench control gate 61. Gate 61 may be armed from an arming potential source, shown by way of example as a battery 63 and an arming switch 62. With switch 62 closed, a negative pulse applied to gate 61 gives rise to a negative pulse on an output lead 64. It may be mentioned that a negative output pulse in response to a negative input pulse can be obtained from gate 61 either by taking the output across a cathode resistor or from the secondary of a pulse transformer in the plate circuit of the gate.

Assume that the right-hand tube of generator 73 is initially oscillating. A quench potential is thereby applied to electrodes 23' over a lead 17' as illustrated by the potential envelope $E_{23}$ (Fig. 8). With gate 61 armed, the negative pulse from gate 61 appears on lead 64 at the end of interval $t_1$ (Fig. 8) and triggers generator 73 to operation on its right-hand side. Consequently, the quench potential on electrodes 23' falls, and the quench potential on electrodes 22' rises during the interval $t_2$ as illustrated in Fig. 8. At the end of interval $t_2$, multivibrator 52 changes state, as previously described, and the resulting negative potential on lead 54 triggers generator 73 to again reverse the quench potentials. Therefore, with gate 61 armed, the energizing and quenching potentials are applied to the register of Fig. 9 in the timed relation illustrated in Fig. 8, and thus the shifting of glow discharges occurs in a manner entirely analogous to that described hereinbefore in regard to the register of Fig. 6.

An entered pattern of glow discharges may be held without shifting by simply disarming gate 61. In this event, generator 73 remains operating on its left-hand side, thereby applying a quench potential to electrodes 23' throughout each shift cycle. Assume, for example, that a glow discharge is held between electrode 21'(1) and electrode 22'(2) at the beginning of a shift cycle, i. e., at the beginning of interval $t_1$ (Fig. 8). During the interval $t_1$ the glow decays, but since it is not subjected to a quench potential, the region between electrodes 22'(2) and 20'(2) remains primed. Thus, when the energizing potential $E_{20}$ is applied during interval $t_2$, the glow is picked up between electrodes 22'(2) and 20'(2). However, during the interval $t_2$, the glow discharge does not shift to the region between electrodes 20'(2) and 23'(2) because the electrodes 23' remain activated by the quench potential. Instead, the region between electrodes 21'(1) and 22'(2) remains primed, and when the energizing potential $E_{21}$ is applied to electrodes 21' at the beginning of interval $t_4$, the glow discharge returns to its original position between electrodes 21'(1) and 22'(2). In other words, no shift occurs; a glow discharge simply goes from an electrode 21' to an adjacent electrode 20' and back again as the high frequency energizing potentials are alternately applied.

Pulses to control trigger circuit 67 for the entry of glow discharges into the register are also derived from the common control circuit, namely, from multivibrator 52 and univibrator 57. Multivibrator 52 changes state at the beginning of interval $t_1$; the consequent potential change on lead 55 interrogates gate 58. If this gate is armed as, for example, by the closed condition of a switch 74, a pulse is developed on lead 65 and resets trigger circuit 67. When trigger circuit 67 is reset, a glow discharge exists between electrodes 69 and 70, and the region between electrodes 20'(1) and 22'(1) is thereby primed. Therefore, electrode 20'(1) picks up a glow discharge when potential $E_{20}$ is applied during interval $t_2$. When the potential $E_{21}$ returns to electrodes 21' during the interval $t_4$, this glow discharge shifts to electrode 21'(1) to complete the entry of a "1"-representing glow discharge. The input control trigger circuit 67 is set by a pulse on lead 60 when univibrator 57 returns to its normal state at the end of interval $t_2$.

If gate 58 remains unarmed during a digit interval or shift cycle, the trigger circuit 68 remains set, and the stabilizing glow remains between electrodes 68 and 69; therefore, no glow discharge is entered. Thus, in the embodiment of Fig. 9, by control of gates 58 and 61, a pattern of glow discharges may be entered into the register and held or shifted as desired. With the connections shown, the glow pattern is shifted to the right, but it should be noted that left shifting is possible by interchanging the input leads 54 and 64 to the low frequency generator 73.

Fig. 11 shows an arrangement by which a binary word and its complement may be simultaneously registered. This complement register may be driven from an energizing, control and quench circuit similar to that shown in Fig. 9. Analogous reference numbers are accordingly applied in Fig. 11 to the energizing leads 14' and 15', the input control leads 60 and 65, and to the quench leads 17' and 18'.

In Fig. 11, an envelope 100 forms two glow discharge register channels having a common gaseous atmosphere. A common gaseous atmosphere is not essential but it is desirable because the consequent uniformity of the gas in both channels assures more uniform operation. The two glow discharge channels are, in effect, connected in parallel. The input arrangement is similar to that shown in Fig. 9 except that input electrode 68 is positioned adjacent electrode 20 of the upper channel. As described in connection with Fig. 9, when the trigger circuit is reset, a glow discharge exists between electrodes 69 and 70, and thus electrode 20 of the lower channel is primed. However, when trigger circuit 67 is set, the glow discharge exists between input electrodes 68 and 69, thereby priming electrode 20 of the upper channel. It is clear from the previous description of operation of the input circuit that when the trigger circuit is reset, a glow is entered into the lower register and simultaneously a "no-glow" is entered into the upper register. Conversely, when trigger circuit 67 is set, a glow is entered into the upper register and a no-glow into the lower register. It may be assumed that the binary word is entered into the lower, or 1's, channel and therefore the complement of this word is entered into the upper, or 0's, channel. Thus, when a glow exists in a given position of one channel, a no-glow condition exists in the corresponding position of the other channel. A distinct advantage of the complement tube arrangement is that the number of glow discharges existing in the register is constant; therefore, the loading on the energizing and quenching generators is constant. Another important feature of the complement tube arrangement is the possibility of a simple error-checking output circuit since the sum of the values in each channel in any order should always be "1."

The use of D. C. change or of pulses for the quench potentials is discussed hereinbefore and several suitable "D. C. waveforms" are illustrated in Fig. 3. A circuit for developing pulse-type quench potenitals is shown in Fig. 12. A pair of univibrators 117 and 118 are employed as pulse generators to develop quench potential pulses similar to that shown as $E_{240(1)}$ (Fig. 3). This circuit may be used with any of the gas tube registers hereinbefore described. Accordingly, the same reference numerals are applied to the high frequency output leads 14 and 15 (Fig. 12) and to the quench output leads 17 and 18, as in previous embodiments, i. e., leads 14 and 15 are connected to energizing electrodes 21 and 20, respectively, and leads 17 and 18 are connected to quench electrodes 23 and 22, respectively. No specific circuitry is shown in Fig. 12 for controlling the entry of glow discharges into a register. However, the quench gate input of Fig. 6 may be controlled by connecting low frequency generator 25 (Fig. 6) through gate 26 to lead 105 (Fig. 12). The three-internal-electrode input arrangement of Figs. 9 and 11 may be controlled by connecting lead 60 (Figs. 9 and 11) to lead 105 (Fig. 12) and lead 65 (Figs. 9 and 11) through the input control gate 58 (Fig. 9) to lead 113 (Fig. 12). It should be noted that the various input arrangements shown in the above-mentioned co-pending applications Nos. 521,555 and 588,022 may also be adapted for use with the glow discharge registers of the present invention.

Operation of the circuit of Fig. 12 is controlled by shifting pulses periodically applied to lead 45, for example, from a clock pulse source as previously described in connection with Fig. 6. A pulse on lead 45 sets a trigger circuit 101, and the resultant high potential on a lead 114 keys a high frequency generator 115 Off, as shown by $E_{14}$ in the timing diagram of Fig. 13. The resultant negative potential on lead 112 from the trigger circuit is differentiated into a quench generator triggering pulse and is applied to a univibrator 117. Univibrator 117 is thereby triggered to its abnormal state. The action of univibrator 117 is somewhat delayed by proper choice of univibrator circuit elements and its period of operation is relatively short. Thus, the potential on quench output lead 17 both rises and falls during the interval $t_1$, as illustrated by $E_{17}$ (Fig. 13).

The shift pulse on lead 45 also triggers a univibrator 102 to its abnormal state. This univibrator determines the interval $t_1$ (Fig. 13). At the end of interval $t_1$, univibrator 102 returns to its normal state, and an output pulse on a lead 103 triggers a multivibrator 104 to its abnormal state. The consequent negative potential on a lead 113 keys a high frequency generator 116 On to produce an energizing potential output on lead 15, as shown by $E_{15}$ (Fig. 13). At the end of interval $t_2$, univibrator 104 returns to its normal state, generator 116 is keyed Off, and a pulse on a lead 105 keys univibrator 106 to its abnormal state. A gate 110 is armed by a potential source 108 through a switch 109 shown in its "shift" position. Therefore, the pulse on lead 105 also "passes through" gate 110 and triggers univibrator 118. The action of univibrator 118 is similar to that described for univibrator 117 and the output on lead 18 is illustrated by $E_{18}$ (Fig. 13). Univibrator 106 determines interval $t_3$, and when this univibrator returns to its normal state, a pulse is developed on a lead 107. This pulse resets trigger circuit 101 to again key On generator 115. After the interval $t_4$ (Fig. 13), a subsequent shift pulse on lead 45 arrives to initiate another shift cycle.

The above description applies to a normal right shift of a glow discharge pattern in the register, as indicated in Fig. 13. Note that for a right shift, it is necessary to apply a quench potential to electrodes 23 during the interval $t_1$, and to electrodes 22 during the interval $t_3$. If it is desired to hold a glow discharge pattern in the register without shifting it, then a quench potential must be applied to electrodes 23 during both interval $t_1$ and interval $t_3$. In other words, one set of quench electrodes must be excited during both "quench" intervals $t_1$ and $t_3$, while the other set of quench electrodes must remain unexcited throughout the cycle. This hold action is accomplished in the circuit shown in Fig. 12 by gating both quench generator triggering pulses to a single quench generator, namely, to univibrator 117. It will be noted that when switch 109 is closed to its "hold" position, a gate 111 is armed instead of gate 110. Thus, the quench generator triggering pulse on lead 105, at the beginning of interval $t_3$, "passes through" gate 111 and triggers univibrator 117. This quench action during a "hold" cycle is illustrated by the bracketed timing diagrams designated "hold" in Fig. 13. The wave form $E_{17}$ occurs during both quench intervals, while wave form $E_{18}$ does not occur at all during a hold cycle.

Quenching by D. C. may also be obtained by replacing each univibrator 117 and 118 (Fig. 12) with a respective trigger circuit. Input leads 112 and 119 (Fig. 12) are then connected to respective symmetrical inputs of the trigger circuits, and leads 17 and 18 are connected to respective outputs of the trigger circuits. Thus, each input pulse actuates the trigger to change the D. C. level on its output lead thereby producing a quench potential similar to $E_{240(4)}$ or $E_{240(5)}$ Fig. 3.

An alternate type of quench potential generator is shown in Fig. 14. It is essentially a pulse-excited parallel-resonant circuit comprising a coil 129 and a capacitor 126 in the plate circuit of a triode 125. The tube is biased to cutoff by a potential source 124, and is driven through a pulse transformer 123. Thus, a pulse on an input terminal 121 is amplified by the tube, and this amplified pulse excites the tuned circuit. The oscillation of the tuned circuit is damped in a controlled manner by a resistance 132, and is coupled through a capacitor 127 to an output terminal 128. This damped wave output is illustrated in Fig. 15. The considerations as to frequency and amplitude of A. C. quench potentials previously discussed are pertinent here. The initial amplitude of the damped wave must be low enough not to cause appreciable ionization, and the frequency must be low enough to cause displacement oscillations of sufficient magnitude to sweep out and diffuse the glow discharge plasma. The parameters of the circuit of Fig. 14, particularly resistor 132, may be adjusted so that the amplitude of the damped wave falls to about one third of its initial value by the end of a quench interval, such as $t_1$ or $t_3$ (Fig. 13).

A pair of damped-wave quench generators may be substituted directly for the pulse-quench univibrators 117 and 118 in the circuit of Fig. 12. Respective input terminals 121 (Fig. 14) are then connected to pulse leads 112 and 119 (Fig. 12); similarly, respective output terminals 128 (Fig. 14) of the damped-wave quench generators are connected to quench output leads 17 and 18 (Fig. 12). Damped wave A. C. quenching offers several advantages. For example, timing problems are less critical and as compared to the A. C. quenching previously discussed, the damped wave quenching is more efficient.

I claim:

1. A glow discharge quench gate comprising: a glow discharge channel containing an ionizable gas and first and second energizing electrodes adjacent said channel; means for selectively applying high frequency energizing potentials to said energizing electrodes; a pair of reference electrodes connected to a low impedance for said energizing potential, each of said reference pair of electrodes being positioned adjacent said channel and in cooperative relation with a respective one of said energizing electrodes; a quench electrode adjacent said channel, positioned between said pair of reference electrodes and in cooperative relation with both of said energizing electrodes; and means for selectively applying a quenching potential to said quench electrode.

2. A glow discharge shifting device comprising: a glow discharge channel containing an ionizable gas and having first and second diametrically opposed sides; first and second arrays of energizing electrodes positioned adjacent the first side of said channel; means interconnecting the two arrays of energizing electrodes in sequentially alternate arrangement; means for selectively applying energizing potentials to each of said first and second arrays of energizing electrodes; first and second arrays of quenching electrodes positioned adjacent the second side of said channel; means connecting said first and second arrays of quenching electrodes in sequentially alternate arrangement, with each quenching electrode overlapping an electrode of each of said first and second arrays of energizing electrodes; and means for selectively applying quenching potentials to said first and second arrays of quenching electrodes.

3. In a glow discharge shift register, the combination of: an envelope containing an ionizable gas; first and second iterative arrays of energizing electrodes adjacent said envelope; first and second iterative arrays of quenching electrodes adjacent said envelope, each quenching electrode being disposed in cooperative relation with an electrode of each of said first and second arrays of energizing electrodes; a normally nonoperating energizing means connected to said first array of energizing electrodes; a normally operating energizing means connected to said second array of energizing electrodes; a normally nonoperating quenching means connected to said first array of quenching electrodes; a normally operating quenching means connected to said second array of quenching electrodes; means for establishing a glow discharge between a selected energizing electrode and a cooperating quenching electrode; and a control circuit connected to each energizing means and to each quenching means for controlling said energizing means and said quenching means in a predetermined sequence for effecting a shift of said glow discharge.

4. A gaseous discharge device comprising: a tube filled with ionizable gas; a plurality of electrodes each forming a ring around said tube and connected in a sequentially alternate arrangement including a plurality of first energizing electrodes, a plurality of first quenching electrodes, a plurality of second energizing electrodes, and a plurality of second quenching electrodes; a circuit for applying high frequency potentials alternately and periodically to said first and second energizing electrodes; quenching means normally applying a low frequency potential to said second quenching electrodes; a pair of connections from said circuit to said quenching means; a normally unarmed gate constituting a part of one of said connections; means for arming said gate to permit said circuit to control said quenching means for applying alternating potentials alternately to said first and second quenching electrodes and in a predetermined timed relation to the application of said high frequency potentials to said first and second energizing electrodes.

5. In a glow discharge shifting device comprising a tube filled with ionizable gas and respective arrays of energizing and quenching electrodes, the combination of: a first internal electrode positioned within said tube; a second internal electrode adjacent said first internal electrode; a third internal electrode adjacent said second internal electrode and in priming relation to a selected energizing electrode; an input control trigger circuit having respective set and reset inputs and outputs; a connection from said reset output to said third internal electrode; a connection from said set output to said first internal electrode; a direct potential source connected to said second internal electrode for maintaining a glow discharge between said second internal electrode and said third internal electrode when said trigger circuit is reset, and between said second internal electrode and said first internal electrode when said trigger circuit is set; means for periodically applying a set pulse to said set input; and selectably controllable means for resetting said trigger circuit to prime said selected energizing electrode.

6. In a gaseous discharge device for simultaneously registering a binary word and the complement of said word, the combination of: first and second glow discharge channels each containing ionizable gas and having respective arrays of energizing and quenching electrodes connected in parallel; a first internal electrode in said first channel positioned in priming relation to a selected energizing electrode of said first channel; a second internal electrode in said second channel positioned in priming relation to a selected energizing electrode of said second channel; a third internal electrode positioned in operative relation to said first and second internal electrodes; a normally reset input control trigger circuit having respective set and reset outputs; a connection from said reset output to said first internal electrode; a connection from said set output to said second internal electrode; a direct potential source connected to said third internal electrode for maintaining a glow discharge between said first internal electrode and said third internal electrode when said trigger circuit is reset and between said second internal electrode and said third internal electrode when said trigger circuit is set; and selectably operable means for setting and resetting said trigger circuit.

7. In a gaseous discharge device, the combination of: first and second glow discharge channels each containing an ionizable atmosphere; respective arrays of first and second energizing electrodes spaced along said channels; respective arrays of first and second quenching electrodes spaced along said channels in cooperative relation to said energizing electrodes; means for entering a first glow pattern representative of the true form of a binary word into said first channel; means for entering a second glow pattern representative of the complement of said binary word into said second channel; means for alternately applying energizing potentials to said first and second arrays of energizing electrodes; and means for selectively applying quenching potentials to said first and second arrays of quenching electrodes for simultaneously shifting said first and second glow patterns.

8. The device defined in claim 7, wherein said first and second channels are formed of a single envelope.

9. In a glow discharge shift register, the combination of: a glow discharge channel containing an ionizable atmosphere; first and second arrays of energizing electrodes in sequentially alternate arrangement along said channel; first and second arrays of quenching electrodes in sequentially alternate arrangement along said channel, each quenching electrode being positioned in glow sustaining relation to a respective electrode of each of said first and second arrays of energizing electrodes; means for establishing a glow discharge at a given electrode of said second array of energizing electrodes; and a cyclically operable circuit for shifting said glow discharge to a next adjacent electrode of said second array of energizing electrodest during each cycle of operation of said circuit, said cyclically operable circuit comprising: (1) means for normally applying an energizing potential to said second array of energizing electrodes; (2) means for removing said energizing potential from said second array of energizing electrodes at the beginning of each cycle of operation of said circuit; (3) means for applying a quenching potential to said second array of quenching electrodes during a first predetermined interval of said cycle; (4) means for applying an energizing potential to said first array of energizing electrodes during a second predetermined interval of said cycle; (5) means for applying a quenching potential to said first array of quenching electrodes during a third predetermined interval of said cycle; and (6) means for returning said normally applied energizing potential to said first array of energizing electrodes during a fourth predetermined interval of said cycle.

10. The combination defined in claim 9, wherein each means for applying a quenching potential comprises an oscillator for providing a alternating quenching potential.

11. The combination defined in claim 9, wherein each means for applying a quenching potential comprises a pulse generator for providing a pulse quenching potential.

12. The combination defined in claim 9, wherein said means for applying a quenching potential to said first array of quenching and said means for applying a quenching potential to said second array of quenching electrodes comprise a bistable alternating potential oscillator.

13. The combination defined in claim 9, wherein each means for applying a quenching potential comprises a circuit for generating a damped-wave quenching potential.

14. The combination defined in claim 9, wherein all of said energizing and quenching electrodes are contained within said channel.

15. In a glow discharge shift register, the combination of: a glow discharge channel containing an ionizable atmosphere; first and second arrays of energizing electrodes in sequentially alternate arrangement along said channel; first and second arrays of quenching electrodes in sequentially alternate arrangement along said channel, each of said quenching electrodes being positioned in glow sustaining relation to a respective electrode of each of said first and second arrays of energizing electrodes; input means for establishing a glow discharge at an initial electrode of said second array of energizing electrodes; and a cyclically operable circuit for shifting said glow discharge to a next adjacent electrode of said second array of energizing electrodes during each cycle of operation of said circuit, said cyclically operable circuit comprising: (1) means for normally applying an energizing potential to said second array of energizing electrodes; (2) a first source of direct potential connected to said first array of quenching electrodes; (3) a second source of direct potential connected to said second array of quenching electrodes; (4) means for removing said energizing potential from said second array of energizing electrodes at the beginning of each cycle of operation of said circuit; (5) means for causing a change in the potential of said second direct potential source during a first predetermined interval of said cycle; (6) means for applying an energizing potential to said first array of energizing electrodes during a second predetermined interval of said cycle; (7) means for causing a change in the potential of said first direct potential source during a third predetermined interval of said cycle; and (8) means for returning said normally applied energizing potential to said second array of energizing electrodes during a fourth predetermined interval of said cycle.

16. In a glow discharge shift register, the combination of: a glow discharge channel containing an ionizable atmosphere; first and second arrays of energizing electrodes in sequentially alternate arrangement along said channel; first and second arrays of quenching electrodes in sequentially alternate arrangement along said channel, each of said quenching electrodes being positioned in glow sustaining relation to a respective electrode of each of said first and second arrays of energizing electrodes; input means for establishing a glow discharge at a predetermined electrode of said second array of energizing electrodes; a cyclically operable circuit for shifting each entered glow discharge from one electrode of said second array of energizing electrodes to a next adjacent electrode of said second array of energizing electrodes during each cycle of operation of said circuit to thereby establish a pattern of glow discharges in said channel, said cyclically operable circuit comprising: (1) means for normally applying an energizing potential to said second array of energizing electrodes; (2) a first quenching potential source connected to said first array of quenching electrodes; (3) a second quenching potential source connected to said second array of quenching electrodes; (4) means for removing said energizing potential from said second array of energizing electrodes at the beginning of each cycle of operation of said circuit; (5) means for enabling said second quenching potential source during a first predetermined interval of said cycle; (6) means for applying an energizing potential to said second array of energizing electrodes during a second predetermined interval of said cycle; (7) means for enabling said first quenching potential source during a third predetermined interval of said cycle; and (8) means for returning said normally applied energizing potential to said second array of energizing electrodes during a fourth predetermined interval of said cycle; with selectably operable means for altering the operation of said circuit to thereby hold said pattern of glow discharges in said channel, said altering means including: (1) means for disabling one of said quenching potential sources throughout said cycle; and (2) means for enabling the other of said quenching potential sources during both said first and third predetermined intervals.

17. In a glow discharge shift register, the combination of: an envelope containing an ionizable gas; first and second iterative arrays of energizing electrodes adjacent said envelope; first and second iterative arrays of quenching electrodes adjacent said envelope, each of said quenching electrodes being in cooperative relation with a respective electrode of each of said first and second arrays of energizing electrodes; a normally nonoperating energizing means connected to said first array of energizing electrodes; a normally operating energizing means connected to said second array of energizing electrodes; a normally nonoperating quenching means connected to said first array of quenching electrodes; a normally operating quenching means connected to said second array of quenching electrodes; means for continually priming a jacent electrode of said second array of energizing electrodes; a separate quenching electrode positioned in cooperative relation to said selected electrode; a normally operating quenching potential generator connected to said separate quenching electrode for inhibiting a glow discharge transfer from said selected electrode to an adjacent electrodes of said second array of energizing electrodes; means for disabling said generator to permit said glow discharge transfer; and a control circuit connected to each energizing means and to each quenching means for controlling said energizing means and said quenching means in a predetermined sequence for effecting a shift of said glow discharge.

References Cited in the file of this patent

UNITED STATES PATENTS

| | | |
|---|---|---|
| 2,639,379 | Blancher | May 19, 1953 |
| 2,661,421 | Talamini | Dec. 1, 1953 |
| 2,679,978 | Kandiah | June 1, 1954 |
| 2,739,266 | Burnett | Mar. 20, 1956 |